(12) United States Patent
Pabla

(10) Patent No.: US 7,774,717 B2
(45) Date of Patent: *Aug. 10, 2010

(54) METHOD AND APPARATUS FOR DETECTING DEVICE SUPPORT IN A GRAPHICAL USER INTERFACE

(75) Inventor: Kuldipsingh Pabla, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 1092 days.

This patent is subject to a terminal disclaimer.

(21) Appl. No.: 11/093,915

(22) Filed: Mar. 29, 2005

(65) Prior Publication Data

US 2005/0172243 A1  Aug. 4, 2005

Related U.S. Application Data

(63) Continuation of application No. 09/201,644, filed on Nov. 30, 1998, now Pat. No. 6,930,695.

(51) Int. Cl.
*G06K 15/00* (2006.01)
(52) U.S. Cl. ........................ 715/805; 715/831
(58) Field of Classification Search ........... 715/764, 715/760, 748, 749, 859–862, 805, 831, 762–763; 709/223, 203; 707/100; 717/100
See application file for complete search history.

(56) References Cited

U.S. PATENT DOCUMENTS

| | | | | |
|---|---|---|---|---|
| 5,625,835 A | * | 4/1997 | Ebcioglu et al. | 712/23 |
| 5,701,485 A | * | 12/1997 | Guillen et al. | 719/315 |
| 5,805,796 A | * | 9/1998 | Finch et al. | 714/40 |
| 6,134,707 A | * | 10/2000 | Herrmann et al. | 717/139 |
| 6,137,488 A | * | 10/2000 | Kraft et al. | 715/866 |
| 6,173,239 B1 | * | 1/2001 | Ellenby | 702/150 |
| 6,272,537 B1 | * | 8/2001 | Kekic et al. | 709/223 |
| 6,275,935 B1 | * | 8/2001 | Barlow et al. | 713/182 |
| 6,307,574 B1 | * | 10/2001 | Ashe et al. | 715/765 |
| 6,334,126 B1 | * | 12/2001 | Nagatomo et al. | 707/4 |
| 6,362,840 B1 | * | 3/2002 | Burg et al. | 715/835 |
| 6,865,735 B1 | * | 3/2005 | Sirer et al. | 717/158 |
| 2002/0085041 A1 | * | 7/2002 | Ishikawa | 345/804 |

* cited by examiner

*Primary Examiner*—Steven P Sax
(74) *Attorney, Agent, or Firm*—Martine Penilla & Gencarella, LLP

(57) ABSTRACT

Embodiments of the invention comprise techniques to detect support for a given input device by a screen element of a graphical user interface (GUI). In one embodiment of the invention, a runtime version of a screen element's program code is examined to detect an ability to process a device's events. In another embodiment of the invention, a determination is made at runtime whether a screen element delegated processing of a given input device's events to other program code. In yet another embodiment of the invention, the runtime version of a screen element's program code is examined to detect a declaration of program code that is indicative of a screen element's support or non-support of a given input device. In yet another embodiment of the invention, one or more of the previously-identified embodiments can be combined.

10 Claims, 7 Drawing Sheets

METHOD AND APPARATUS FOR DETECTING DEVICE SUPPORT IN A GRAPHICAL USER INTERFACE

CROSS REFERENCE TO RELATED APPLICATIONS

This application is a continuation of prior application Ser. No. 09/201,644, filed Nov. 30, 1998, now U.S. Pat. No. 6,930,695 the disclosure of which is incorporated herein by reference.

BACKGROUND

1. Field of the Invention

This invention relates to components of a graphical user interface, and more specifically to device support by components of a graphical user interface.

Portions of the disclosure of this patent document may contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Java and all Java-based trademarks and logos are trademarks or registered trademarks of Sun Microsystems, Inc. in the United States and other countries. All SPARC trademarks are used under license and are trademarks or registered trademarks of SPARC International in the United States and other countries. Products bearing SPARC trademarks are based upon an architecture developed by Sun Microsystems, Inc.

2. Background Art

A graphical user interface (GUI) is used to display information on a video display (or screen) of a computer system. A GUI typically includes screen elements such as windows, icons, labels, fields, etc. A screen element refers to both the display in a GUI and the program code that is used to generate and control the display of the screen element in the GUI. A screen element typically interacts with an operating system that is composed of one or more layers of software routines that control the physical devices that a user uses to interact with the computer system. For example, one or more input devices such as a keyboard or a pointing device (e.g., mouse, touch screen, etc.) may be used by the user. When a user generates input using one of the computer system's input devices, feedback may be provided in the GUI which is displayed by a video display to indicate that the user's input was received and is being or was processed. A problem arises when an incompatibility exists between the device capabilities and expectations of a screen element and the actual device capabilities of a computer system. For example, a screen element may support an input device that is not available in the computer system.

Most personal computers currently available provide a mouse input device that may be used to move within the GUI and over a given screen element. Mouse input that occurs within a region of the GUI occupied by a screen element may be forwarded to the screen element. The screen element processes the mouse input and may provide feedback to be displayed in the GUI. For example, the user can move within the region of the screen element in the GUI and press a button on the mouse to select the screen element. The screen element is informed that the mouse is within its region (e.g., a "mouse enter" event) and that the user has pressed a mouse button within its region (e.g., a "mouse down" event). This process is typically referred to as selecting the screen element. When a screen element is selected, the selected screen element typically becomes the focus within the GUI. For example, the display of the selected screen element can be varied from its previous display and that of the other screen elements to identify it as the currently selected screen element. Events from an input device are typically directed to the currently selected (or focused) screen element.

In the above example, it is assumed that a mouse input device is available on the computer system. Further, it is assumed that the screen element is capable of processing input received from the mouse. However, it is possible that a given input device is unavailable or that the screen element is unable to support a given input device. It would be beneficial to be able to determine the type of input devices whose input a screen element can process. That is, before device input is directed to a screen element, it would be beneficial to know whether the screen element is capable of processing the device input. Further, it may be beneficial to be able to give the look and feel of a given input device in the GUI even though that device is not physically connected to the computer system when a screen element can support that type of input device.

The problems associated with detecting whether a screen element can process device input can be better understood from a review of the Java virtual machine's processing environment and an overview of object-oriented programming.

Object-Oriented Programming

Object-oriented programming is a method of creating computer programs by combining certain fundamental building blocks, and creating relationships among and between the building blocks. The building blocks in object-oriented programming systems are called "objects." A software application can be written using an object-oriented programming language whereby the program's functionality is implemented using these objects.

An object is a programming unit that groups together a data structure (one or more instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and a plurality of arguments. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214-223.

An object class provides a definition for an object which typically includes both fields (e.g., variables) and methods. An object class is used to create a particular "object instance." (The term "object" by itself is often used interchangeably to refer to a particular class or a particular instance.) An instance of an object class includes the variables and methods defined for that class. Multiple instances can be created from the same object class. Each instance that is created from the object class is said to be of the same type or class.

To illustrate, an employee object class can include "name" and "salary" instance variables and a "set_salary" method. Instances of the employee object class can be created, or instantiated for each employee in an organization. Each object instance is said to be of type "employee." Each employee object instance includes "name" and "salary" instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

A hierarchy of classes can be defined such that an object class definition has one or more subclasses. A subclass inherits its parent's (and grandparent's etc.) definition. Each subclass in the hierarchy may add to or modify the behavior specified by its parent class. The parent class is also referred to as a superclass with respect to its subclass(es). Some object-oriented programming languages support multiple inheritance where a subclass may inherit a class definition from more than one parent class. Other programming languages support only single inheritance, where a subclass is limited to inheriting the class definition of only one parent class. The Java programming language also provides a mechanism known as an "interface" which comprises a set of constant and abstract method declarations. An object class can implement the abstract methods defined in an interface. Both single and multiple inheritance are available to an interface. That is, an interface can inherit an interface definition from more than one parent interface.

Java Programming Language and Program Execution

Java applications typically comprise one or more object classes and interfaces. Unlike many programming languages in which a program is compiled into machine-dependent, executable code, classes written in the Java programming language are compiled into machine independent bytecode class files. Each class contains code and data in a platform-independent format called the class file format. A bytecode includes a code that identifies an instruction (an opcode) and none or more operands to be used in executing the instruction. The computer system acting as the execution vehicle contains a program called a virtual machine, which is responsible for executing the code (i.e., bytecode) in Java programming language class files.

Applications may be designed as standalone Java applications, or as Java "applets" which are identified by an applet tag in an HTML (Hypertext Markup Language) document, and loaded by a browser application. The class files associated with an application or applet may be stored on the local computing system, or on a server accessible over a network. Each Java programming language class file is loaded into the Java virtual machine, as needed, by the "class loader."

The classes of a Java applet are loaded on demand from the network (stored on a server), or from a local file system, when first referenced during the Java applet's execution. The virtual machine locates and loads each class file, parses the class file format, allocates memory for the class's various components, and links the class with other already loaded classes. This process makes the code in the class readily executable by the virtual machine.

Java applications and applets often make use of class libraries. Classes in the class libraries may contain what are referred to as "native methods." A native method is a method that is comprised of native code. Bytecodes contained in a class file generated from programming statements written using the Java programming language is an example of machine-independent code. Native code typically refers to platform-dependent code. However, native code may refer to other program code. For example, native code can also be code that is written using a secondary programming language (i.e., a language other than the primary programming language used to write an application).

Applications and applets may occasionally contain classes that declare native methods. A native method declaration specifies the keyword "native," the name of the method, the return type of the method, and any parameters that are passed to the method. In contrast to a "standard method" (i.e., non-native method) written in the Java programming language, there is no body to a native method within the respective class. Rather, the routines of a native method are carried out by compiled native code (e.g., code written in the C or C++ programming language and compiled into binary form) that is dynamically linked to a given class in the virtual machine at runtime using a linking facility specific to the given platform which supports linked libraries.

In the Solaris™ or UNIX environment, for example, the linked library containing the binary form of the native code may be implemented as a "shared object" library written as a ".so" file. In a Windows environment, the linked library may take the form of a dynamic linked (or dynamic loadable) library written as a ".dll" file. Native code may be used to perform functions otherwise not supported by the Java programming language, such as interfacing with specialized hardware (e.g., display hardware) or software (e.g., database drivers) of a given platform. Native code may also be used to speed up computationally intensive functions, such as rendering.

A class that contains a native method also contains a call to load the respective linked library:

System.loadLibrary("Sample");

where "Sample" is the name of the linked library, typically stored in a file named "libSample.so" or "Sample.dll", depending on the host operating system (e.g., UNIX, Windows, etc.). The linked library is typically loaded at the time the associated class is instantiated within the virtual machine.

The linked library of native code is compiled with stub and header information of the associated class to enable the linked library to recognize the method signature of the native method in the class. The implementation of the native method is then provided as a native code function (such as a C function) in the linked library. At runtime, when a call is made to the native method, control is passed to the function in the linked library that corresponds to the called method (e.g., via pushing of a native method frame onto the native method stack). The native code within the linked library performs the function and passes control back to the Java application or applet.

In contrast to a dynamically linked library, code from a statically linked library is linked during compilation. In the Solaris environment, a statically linked library is typically stored in a file with a ".a" extension (e.g., "sample.a"). Statically linked libraries may be used instead of dynamically linked libraries where, for example, there is a limited amount of storage (e.g., a set-top box or personal data assistant).

FIG. 1 illustrates the compile and runtime environments for a processing system. In the compile environment, a software developer creates source files 100 written using the Java programming language, which contain the programmer readable class definitions, including data structures, method implementations and references to other classes. Source files 100 are provided to Java compiler 101, which compiles source files 100 into compiled ".class" (or class) files 102 that contain bytecodes executable by a Java virtual machine. Class files 102 are stored (e.g., in temporary or permanent storage) on a server, and are available for download over a network. Alternatively, class files 102 may be stored locally in a directory on the client platform.

The runtime environment contains a Java virtual machine (JVM) 105 which is able to execute bytecode class files and execute native operating system ("O/S") calls to operating system 109 when necessary during execution. Java virtual machine 105 provides a level of abstraction between the machine independence of the bytecode classes and the machine-dependent instruction set of the underlying computer hardware 110, as well as the platform-dependent calls of operating system 109.

Class loader and bytecode verifier ("class loader") 103 is responsible for loading bytecode class files 102 and supporting class libraries 104 written using the Java programming language into Java virtual machine 105 as needed. Class loader 103 also verifies the bytecodes of each class file to maintain proper execution and enforcement of security rules. Within the context of runtime system 108, either an interpreter 106 executes the bytecodes directly, or a "just-in-time" (JIT) compiler 107 transforms the bytecodes into machine code, so that they can be executed by the processor (or processors) in hardware 110. Native code, e.g., in the form of a linked library 111, is loaded when a class (e.g., from class libraries 104) containing the associated native method is instantiated within the virtual machine.

Interpreter 106 reads, interprets and executes a bytecode instruction before continuing on to the next instruction. JIT compiler 107 can translate multiple bytecode instructions into machine code that are then executed. Compiling the bytecodes prior to execution results in faster execution. If, for example, the same bytecode instruction is executed multiple times in a program's execution, it must be interpreted each time it is executed using interpreter 106. If JIT compiler 107 is used to compile the program, the bytecode instruction may be translated once regardless of the number of times it is executed in the program. Further, if the compilation (i.e., output of JIT compiler 107) is retained, there is no need to translate each instruction during program execution.

The runtime system 108 of virtual machine 105 supports a general stack architecture. The manner in which this general stack architecture is supported by the underlying hardware 110 is determined by the particular virtual machine implementation, and reflected in the way the bytecodes are interpreted or JIT-compiled.

FIG. 2 illustrates runtime data areas which support the stack architecture within runtime system 108. In FIG. 2, runtime data areas 200 comprise one or more thread-based data areas 207. Each thread-based data area 207 comprises a program counter register (PC REG) 208, a local variables pointer register (VARS REG) 209, a frame register (FRAME REG) 210, an operand stack pointer register (OPTOP REG) 211, a stack 212 and, optionally, a native method stack 216. Stack 212 comprises one or more frames 213 which contain an operand stack 214 and local variables 215. Native method stack 216 comprises one or more native method frames 217.

Runtime data areas 200 further comprises shared heap 201. Heap 201 is the runtime data area from which memory for all class instances and arrays is allocated. Shared heap 201 comprises method area 202, which is shared among all threads. Method area 202 comprises one or more class-based data areas 203 for storing information extracted from each loaded class file. For example, class-based data area 203 may comprise class structures such as constant pool 204, field and method data 205, and code for methods and constructors 206. Methods and constructors 206 may also be referred to as method table 206.

A virtual machine can support many threads of execution at once. Each thread has its own thread-based data area 207. At any point, each thread is executing the code of a single method, the "current method" for that thread. If the "current method" is not a native method, program counter register 208 contains the address of the virtual machine instruction currently being executed. If the "current method" is a native method, the value of program counter register 208 is undefined. Frame register 210 points to the location of the current method in method area 202.

SUMMARY

Embodiments of the invention comprise techniques to detect support for a given input device by a screen element of a graphical user interface (GUI). In one embodiment of the invention, a runtime version of a screen element's program code is examined to detect an ability to process a device's events. In another embodiment of the invention, a determination is made at runtime whether a screen element delegated processing of a given input device's events to other program code. In yet another embodiment of the invention, the runtime version of a screen element's program code is examined to detect a declaration of program code that is indicative of a screen element's support or non-support of a given input device. In yet another embodiment of the invention, one or more of the previously-identified embodiments can be combined.

DETAILED DESCRIPTION

A method and apparatus for detecting device support in a graphical user interface is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention comprise techniques to detect support for a given input device by a screen element of a graphical user interface (GUI). In one embodiment of the invention, a runtime version of a screen element's program code is examined to detect an ability to process a device's events. In another embodiment of the invention, a determination is made at runtime whether a screen element delegated processing of a given input device's events to other program code. In yet another embodiment of the invention, the runtime version of a screen element's program code is examined to detect a declaration of program code that is indicative of a screen element's support or non-support of a given input device. In yet another embodiment of the invention, one or more of the previously-identified embodiments can be combined.

Determination of the presence of support for an input device may effect the appearance of the screen element in the GUI display. Further, an identification of support for an input device can facilitate the identification of a screen element where it is otherwise difficult to determine which screen element is to receive an input device's event. For example, where a pointing device (e.g., mouse) is positioned within a region of the GUI that is occupied by more than one screen element, the event can be sent to the screen element that has the ability to process the pointing device's event.

Embodiments of the invention can also be used where one or more input devices are not available. For example; in a set-top box for a television or other information appliance (other examples of information appliances include an electronic address book and/or personal organizer, a smart telephone, and an electronic mail device) that includes a GUI may include only a keyboard device for input. The user might use directional keys (e.g., arrow keys) on the keyboard to mimic a mouse. Using one or more embodiments of the invention, a determination is made whether a screen element supports mouse input. If so, mouse events can be sent to the screen element. Also, an icon that is typically associated with a mouse (e.g., an arrow) can be displayed and moved within the GUI to correspond to the movement associated with a directional key. Therefore, there is no need to modify the screen element to accommodate systems that do not have mouse input devices available.

Figure 7:
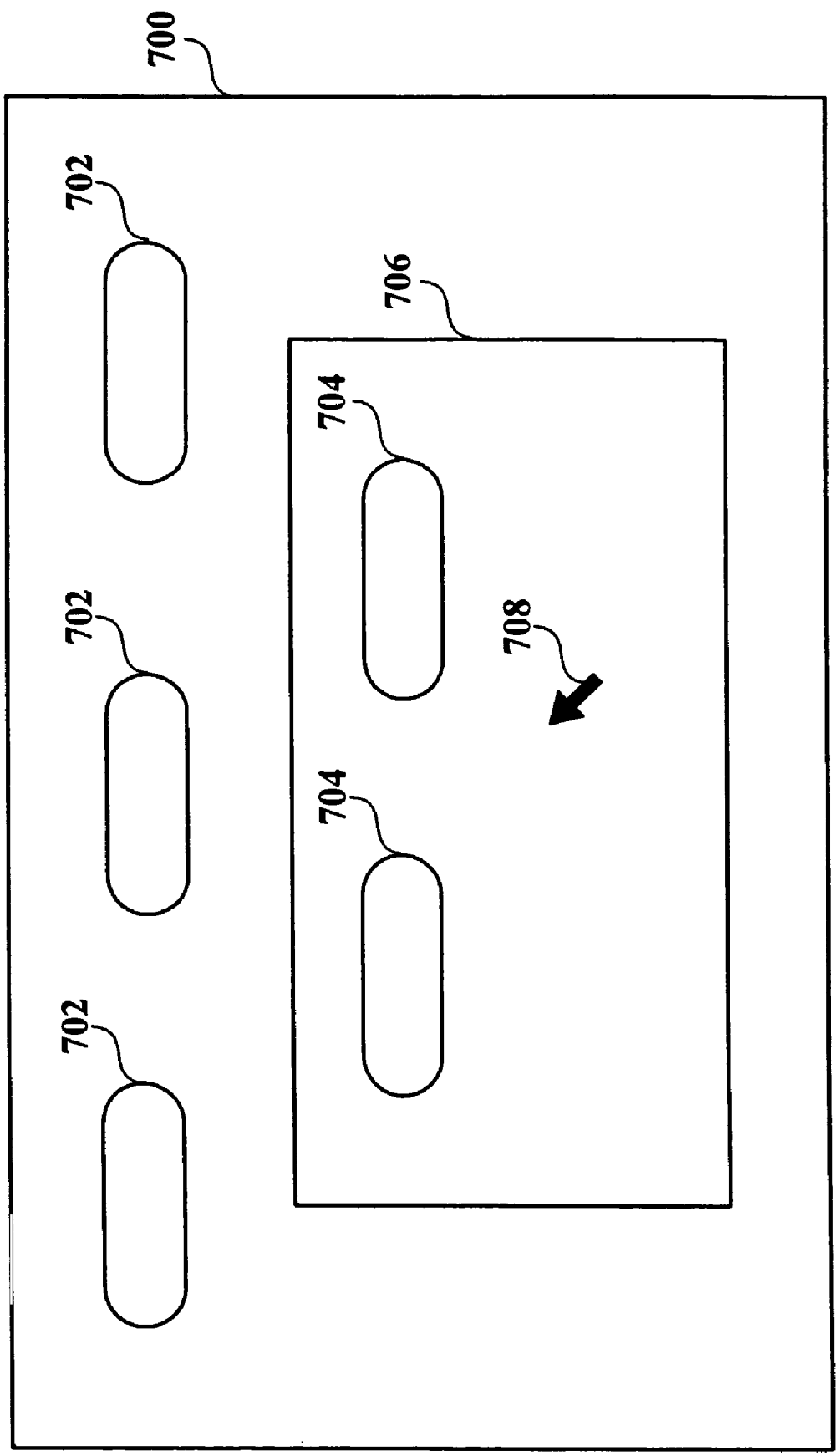
FIG. 7 illustrates a GUI 700 that includes screen elements according to one or more embodiments of the invention.

FIG. 7 illustrates a GUI 700 that includes screen elements according to one or more embodiments of the invention. Embodiments of the invention can be used to make a runtime determination that screen elements 702 do not support a mouse device. However, it can be determined using one or more embodiments of the invention that screen element 706 does support a mouse device. Screen element 706 is a container element in that it can contain other screen elements (e.g., screen elements 704).

The look and feel of screen element 706 can identify that screen element 706 supports mouse input. In this example, mouse icon 708 is displayed in GUI 700. Mouse icon 708 can be moved within screen element 706 to reflect positional input (e.g., positional keys or mouse movement) that is received. If position input is received that is outside screen element 706, icon 708 can be removed from the display of GUI 700. If a focus indication is provided for screen element 706 in GUI 700, the focus indication can be removed from GUI 700 as well when positioning input is received that is outside screen element 700.

The previous example assumes that a system does not include a given input device. However, it should be apparent that a user may wish to use one input device to simulate or emulate another, available device. For example, a user may elect to use the directional keys of a keyboard to simulate mouse input even though the user's system includes a mouse.

A description of embodiments of the invention is provided herein with reference to a mouse device, however, it should be apparent that embodiments of the invention can be applied to other devices. Further, embodiments of the invention are described with reference to the Java programming language. It should be apparent that other programming languages can also be used with embodiments of the invention.

Method Inspection

In one or more embodiments of the invention, screen elements are object-oriented objects written using the Java programming language. Runtime versions of screen elements (in the form of bytecodes) can be examined to determine whether methods for handling a given device type are present.

In an object-oriented programming language such as the Java programming language, the runtime version is a bytecode version of a class definition of a screen element. The bytecode class definition is examined to determine whether the definition includes at least one "device-handling" method.

An object class may inherit methods from another class (e.g., a superclass). Where the screen element's class definition does not include the device method, embodiments of the invention examine the screen element's superclass bytecode object class definition to determine whether the superclass definition includes at least one "device-handling" method.

In some instances the screen element inherits from an originating (or ultimate) superclass that includes input device method abstractions. In this case, method inspection does not examine the originating superclass. For example, a screen element in the Abstract Windowing Toolkit (AWT) such as AWT Button inherits from a hierarchy of classes that begins with an originating superclass (java.awt.Component). The java.awt.Component originating class includes mouse event handlers. The process of examining superclasses of the AWT Button screen element terminates before reaching the originating superclass.

To detect whether a screen element (e.g., a Button class developed using AWT of the Java Development Kit version 1.0 available from Sun Microsystems, Inc.) supports mouse input, method inspection is performed on the screen element's bytecode class definition to detect at least one "mouse-handling" method. The following provides examples of "mouse-handling" methods to be detected in one or more embodiments of the invention:

mouseEnter ( )
mouseExit ( )
mouseDown ( )
mouseUp ( )
mouseDrag ( )
mouseMove ( ).

Where at least one of these mouse-handling methods is detected in the screen element's bytecode class definition, the screen element is marked as being able to support mouse input. An indication that a screen element can support mouse input may also be used to modify the look and feel of the screen element in the GUI.

Figure 1:
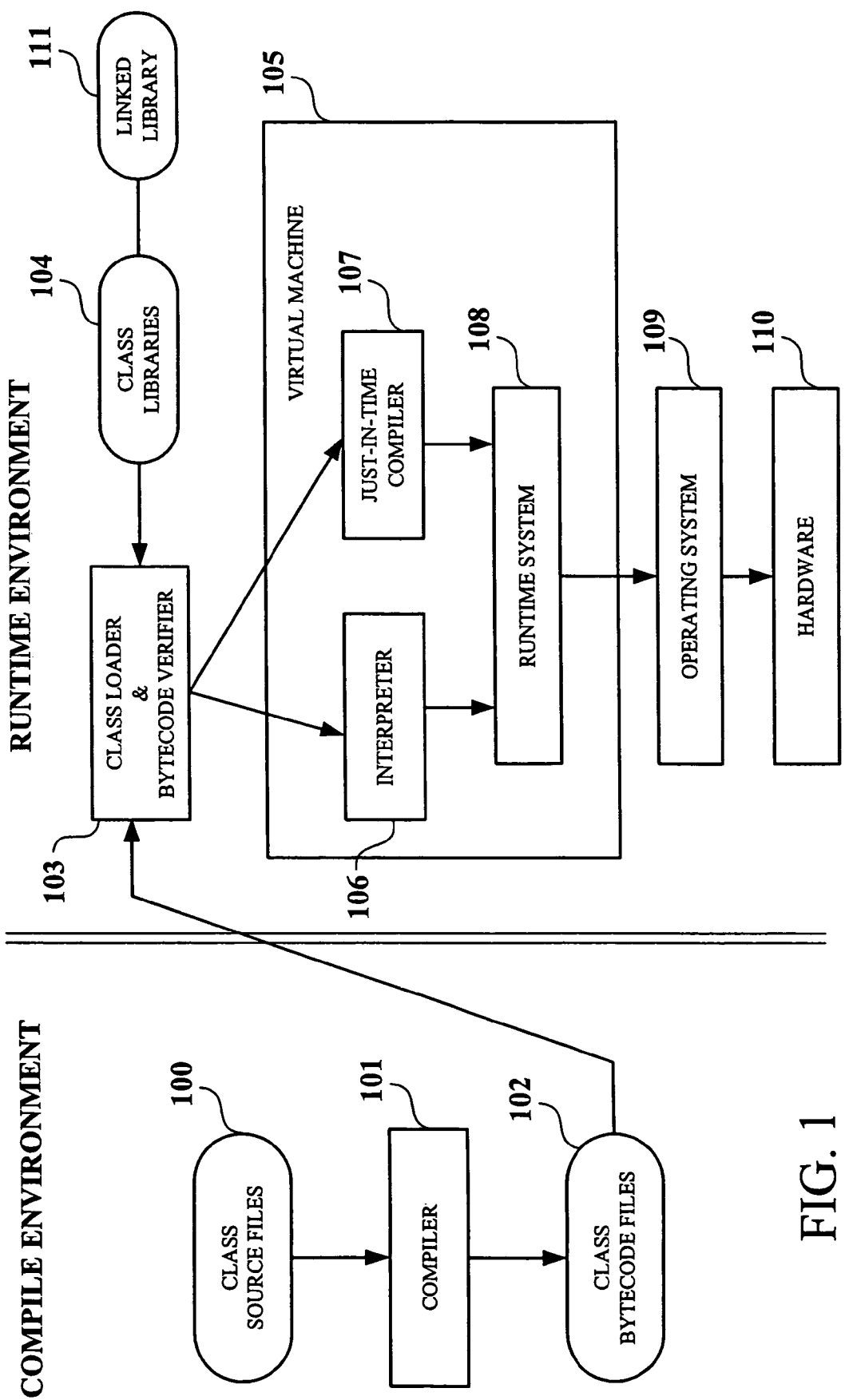
FIG. 1 is a block diagram of compile and runtime environments.
Figure 2:
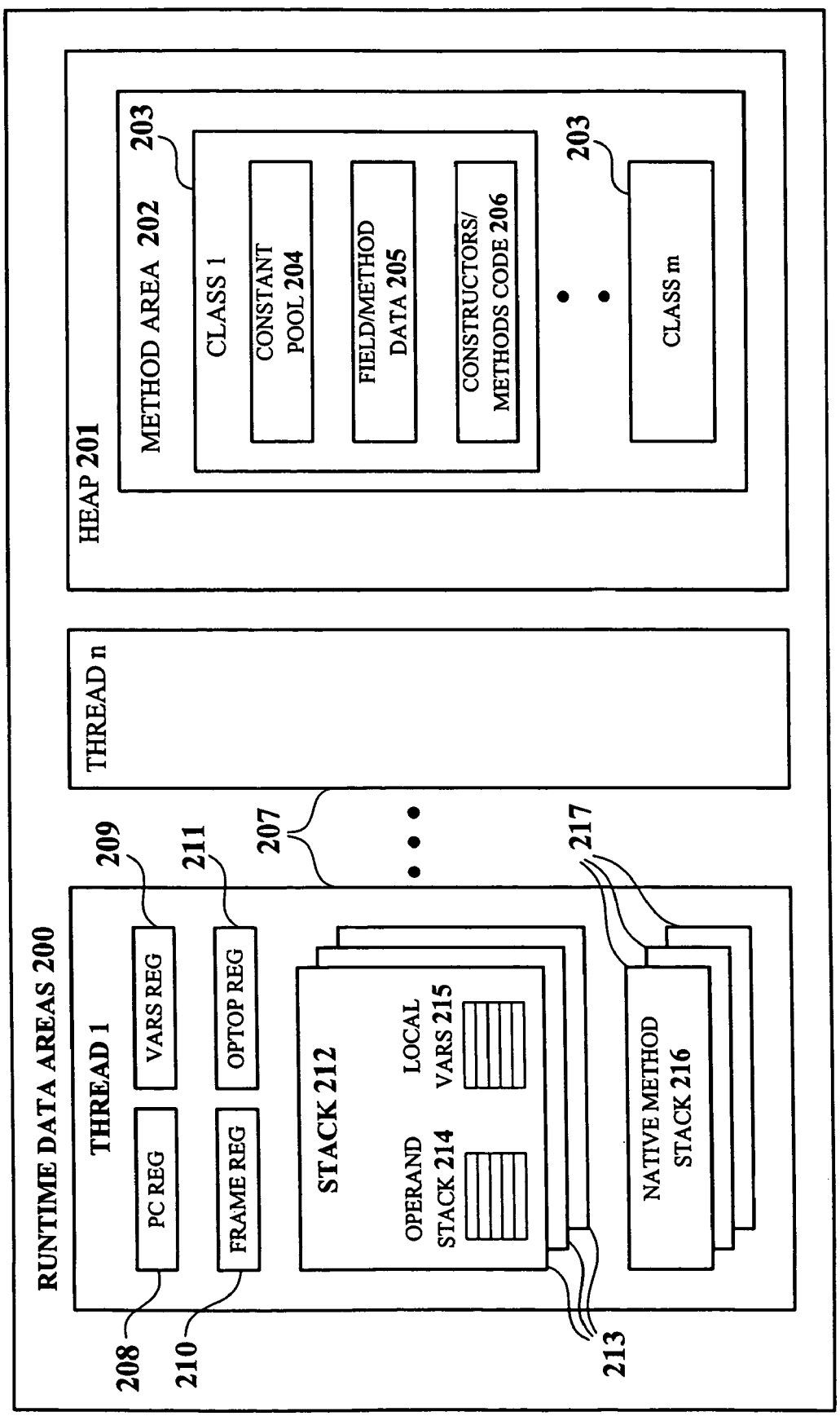
FIG. 2 is a block diagram of the runtime data areas of an embodiment of a virtual machine.
Figure 3:
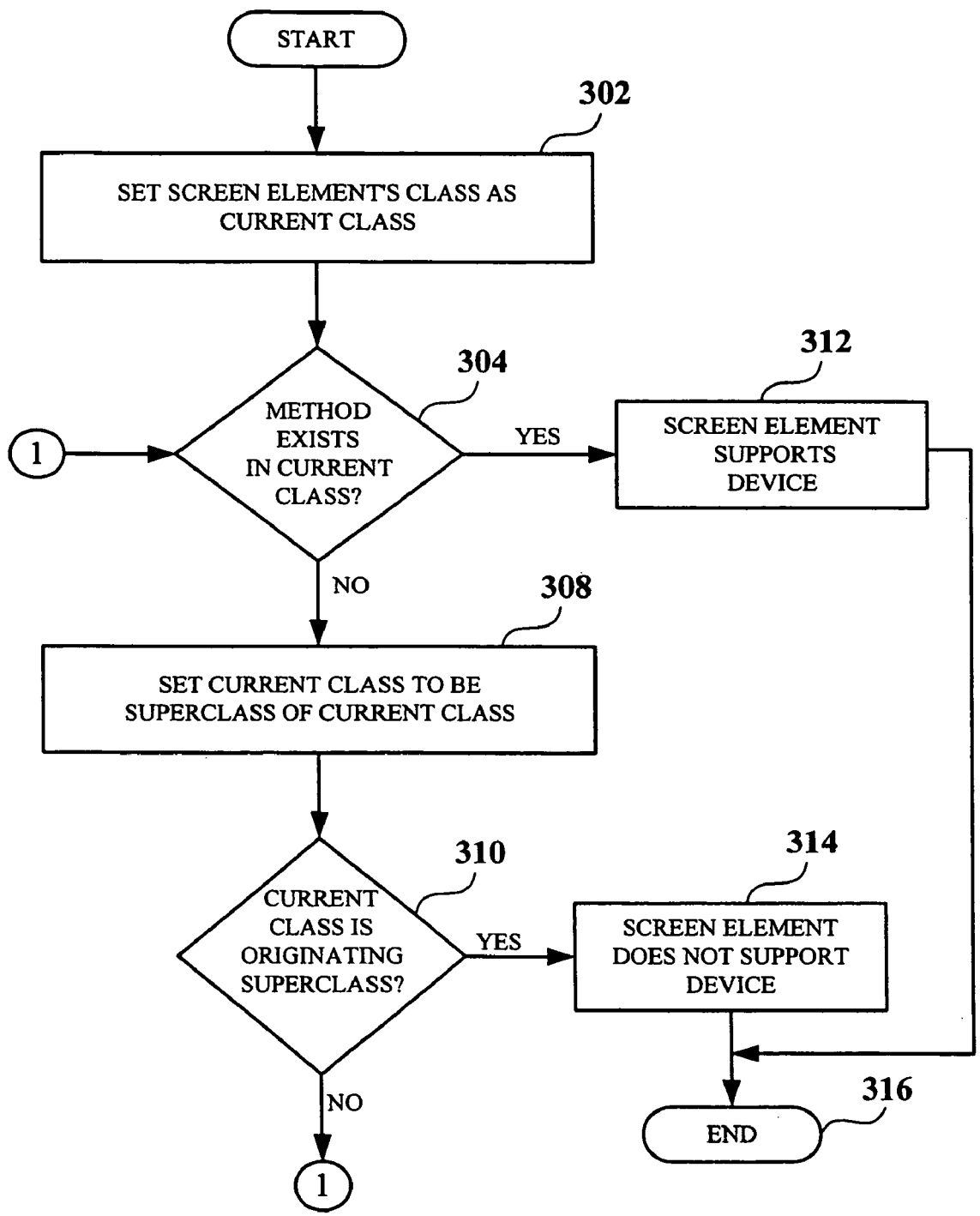
FIG. 3 provides an example of a method inspection process flow according to an embodiment of the invention.

FIG. 3 provides an example of a method inspection process flow according to an embodiment of the invention. The process flow examines a class definition for a method (e.g., a method that processes a device's input such as one of the mouse event methods identified above). If the device method exists in the class definition, the screen element is assumed to support the device. In one embodiment of the invention, the process flow may be executed for each device method until one of the device methods is found.

At step 302, the screen element's class definition becomes the current class definition. At step 304, the current class definition is examined to determine whether a given method exists in the definition. If so, processing continues at step 312 to mark the screen element as supporting input for a given device. Processing ends at step 316.

If the method is not found at step 304, processing continues at step 308 to get a superclass of the current class. The superclass becomes the current class. At step 310, a determination is made whether the current class is the originating superclass (e.g., java.awt.Component). If so, processing continues at step 314 to mark the screen element as not supporting device input. Processing ends at step 316. If it is determined, at step 310, that the current class is not the originating superclass, processing returns to step 304 to examine the current class for the device method.

In one embodiment of the invention, the detection process (e.g., process flow of FIG. 3) is performed at runtime on a Java bytecode class definition that is loaded into memory. A reflection Application Programming Interface (API) that includes methods for inspecting the contents of a class definition is used to examine the bytecode class file for a given method. For example, the getDeclaredMethod method of the reflection API can be used to inspect the class definition for a specified method, return a method object that reflects the specified method or throw an exception (e.g., a NoSuchMethod Exception) if the specified method is not found.

In one embodiment of the invention, the detection process is performed when a screen element's object instance is constructed (i.e., in a constructor method). In a platform-independent virtual machine environment such as that provided by a Java virtual machine, a multi-layer architecture is used to generate a GUI. In the multi-layer architecture, a platform-independent screen element object instance is constructed along with one or more platform-dependent screen element object instances. A peer object instance provides an interface between the platform-independent and platform-dependent object instances. The detection process may be performed in a constructor method of the platform-independent object, the peer object or the platform-dependent object.

Figure 4:
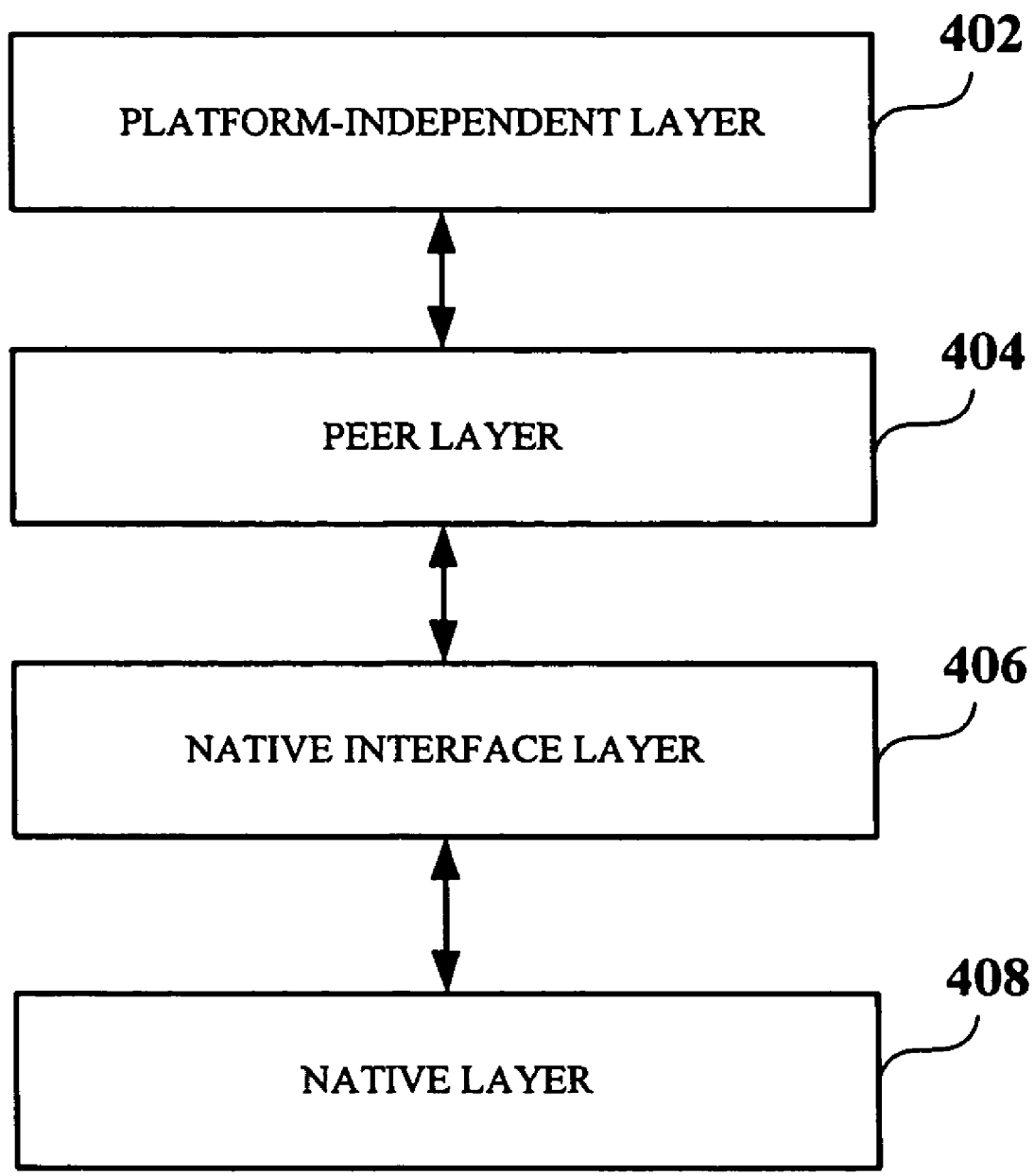
FIG. 4 provides an example of a multiple-layer windowing system used in an embodiment of the invention.

FIG. 4 provides an example of a multiple-layer windowing system used in an embodiment of the invention.

Layer 402 comprises a platform-independent layer. Layer 402 allows a developer to design and implement a GUI that can run on multiple platforms (e.g., Windows 95, Windows NT, OS/2, Solaris). An example in this layer is the AWT that contains a collection of object classes written using the Java programming language. AWT comprises object classes that define the properties and behavior of screen elements that comprise a GUI. For example, an AWT Button object class contains properties and behavior for a button screen element of the GUI. The AWT Button object class provides a platform-independent definition of a button screen element.

Platform-independent screen elements of layer 402 interface with a peer screen element. Peer elements comprise peer layer 404. Peer layer 404 provides a platform-specific abstraction that provides an interface to the platform-specific screen element. For example, an AWT Button instance has a corresponding Button Peer that interfaces with a Windows 95 Button instance.

Peer layer 404 interfaces with native layer 408 via a native interface layer 406. Native interface layer 406 can be the Java Native Interface (JNI), a native programming interface that allows Java code that runs inside a Java Virtual Machine (VM) to interoperate with program code, such as applications and libraries, written in other programming languages (e.g., C, C++, and assembly). Native layer 408 is comprised of a platform-specific windowing and/or operating system (e.g., Windows 95 or Motif). On a Windows platform, a Windows Button element is an example of a native layer screen element.

To illustrate, an AWT Button in platform-independent layer 402 interfaces with a Button Peer of peer layer 404. On a Windows platform, the Button Peer interfaces with a Windows Button of native layer 408 via native interface layer 406. When an AWT Button instance is constructed, the Button Peer and Windows Button instances are also constructed. Constructor methods of each of these object classes are invoked to create the button instances. The detection process (e.g., the detection process of FIG. 3) may be performed in one or more of these constructor methods, for example.

Delegation

In some programming languages (e.g., the Java Development Kit, or JDK, version 1.1 written using the Java programming language), a delegation model allows one object to delegate processing (e.g., device event handling) to another object. In the JDK version 1.1 "Delegation Model," an object (referred to as the "source") can designate another object (called the "listener") to handle its inputs.

A source object includes methods to register "listeners" with the source object. Processing (e.g., event handling) that would otherwise be directed to a source object, is directed to a listener object that has registered with the source object. The "listener" object may be activated by the source object to handle the inputs, for example. A source object can register itself and/or another object as a listener. Thus, a source object may activate itself where it is a registered "listener."

In one embodiment of the invention, a screen element is marked as supporting a device when the screen element has a listener that supports the device.

For example, listeners that support a mouse device are referred to as either a "mouseListener" or a "mouseMotionListener." A screen element may register itself or another object as a "mouseListener" or a "mouseMotionListener."

A screen element is marked as supporting mouse input, if it has at least one "mouseListener" or "mouseMotionListener" registered with it. Conversely, a screen element can be marked as not supporting mouse inputs if neither a "mouseListener" nor a "mouseMotionListener" is registered with the screen element.

A registered "listener" can unregister itself. For example, a "listener" instance that has registered itself as a "mouseListener" and/or a "mouseMotionListener" can request to be unregistered as a "listener." A screen element is marked as not supporting mouse input when the last "mouseListener" or "mouseMotionListener" is unregistered.

In Java, when a mouseListener is registered for a screen element, a private flag (or variable), mouselistener, is set in the java.awt.Component. When a mouseMotionListener is registered for a screen element, java.awt.Component sets a private flag, mouseMotionListener. Because these variables are private, they are not accessible from platform-independent layer 402. These variables may examined at any time during runtime in native layer 408 to determine whether a screen element supports a mouse device. In one embodiment of the invention, a peer element of the peer layer 404 may request a native element of the native layer 408 to inspect the mouseListener and/or mouseMotionListener variables. A screen element is marked as supporting mouse input if one or both of these variables is set.

Interface Introspection

A screen element may include one or more collections of externally-defined methods. Typically, a collection of externally-defined methods is given a name. A screen element that includes a collection of externally-defined methods declares the methods using the name of the collection. In Java, for example, an interface is an example of a collection of constants and abstract methods. A screen element declares an interface by specifying the name of the interface in an implements clause. The methods of the interface are can be overridden by a method definition of the screen element.

The following table provides examples of interfaces in the Personal Java programming language available from Sun Microsystems, Inc.:

| Interface | Description |
| --- | --- |
| NoInputPreferred | The user may not navigate to the screen element. This interface might be appropriate for screen elements such as labels. |
| KeyboardInputPreferred | The screen element will be accessed primarily via keyboard input. An on-screen keyboard may be displayed when the user navigates to or selects this screen element. The developer should ensure that Component isFocusTraversable returns true for this screen element. |
| ActionInputPreferred | This interface is intended for those screen elements that the user would click on or otherwise "activate" using the input device. The screen element should receive a MOUSE_ENTER event when the user navigates to the screen element, and a MOUSE_EXIT event when the user navigates from the screen element. The screen element should receive a MOUSE_DOWN event followed by a MOUSE_UP event when the user selects the screen element. The mouse coordinates for all events associated with this screen element will be the coordinates of the center of the screen element. |
| PositionInputPreferred | The screen element will be used primarily by the user selecting x, y coordinates within the screen element. The screen element should receive MOUSE_ENTER and MOUSE_EXIT events when this user navigates to the screen element. The system should provide some mechanism for selecting specific x, y coordinates within the screen element's bounds, and provide mouse movement events. The platform should decide if selection of x, y coordinate begins when the user navigates to the screen element or when the user selects the screen. element. In either case, the screen element should receive a MOUSE_DOWN and MOUSE_UP event with the selected coordinates. |

In these example interfaces, the NoInputPreferred and KeyboardInputPreferred interfaces do not allow mouse input. Therefore, a screen element that implements these interfaces can be considered to not support mouse input. Thus, according to an embodiment of the invention, if one or both of these interfaces is detected in the runtime version of the screen element, the screen element is marked as not supporting mouse input.

Conversely, where a screen element implements either the ActionInputPreferred or PositionInputPreferred interfaces (or both), it is assumed that the screen element supports mouse input. Therefore, the screen element that implements one or both of these interfaces is marked as supporting mouse input in an embodiment of the invention.

In the Java programming language, an instance of operator can be used to determine the class of an object instance. The instance of operator can also be used to indicate whether an object instance implements an interface. The instance of operation can be placed in the peer element (e.g., Button Peer) constructor method to test for a given interface implementation associated with a screen element. The following instance of pseudocode example is used in an embodiment of the invention to detect whether an object instance supports mouse input:

if (element instance of ActionInputPreferred)
   mark the screen element as supporting mouse input
if (element instance of PositionalInputPreferred)
   mark the screen element as supporting mouse input.

Lightweight Element

A lightweight element is a screen element that does not need a corresponding screen element in native layer 408. A lightweight element typically looks the same on different platforms. An example of a lightweight element is an element that displays a graphic image (e.g., a .gif file). Since there is no native layer element, native layer 408 is not necessarily aware of the lightweight element.

In one embodiment of the invention, a lightweight element is initially marked as supporting device input. This default may be overridden. For example, a lightweight element may implement one or both of the NoInputPreferred or KeyboardInputPreferred interfaces. In this case, the lightweight element is marked as unable to support a mouse device. As discussed above, the instance of operator of the Java programming language can be used to detect the inclusion of an interface.

Figure 5:
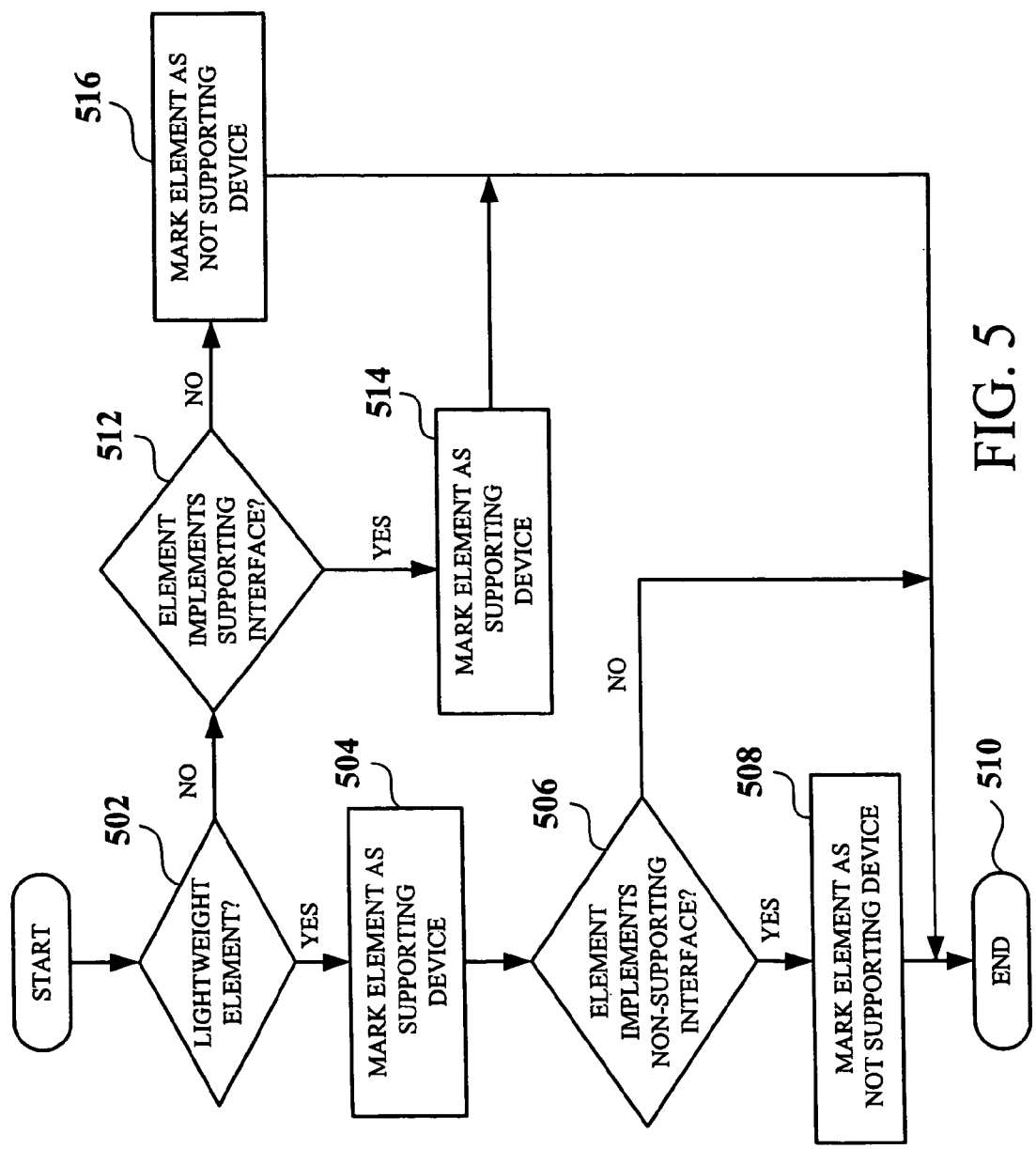
FIG. 5 provides an example of a process flow to detect a declaration such as an interface declaration according to an embodiment of the invention.

FIG. 5 provides an example of a process flow to detect a declaration such as an interface declaration according to an embodiment of the invention. At step 502, a determination is made whether the screen element is a lightweight element. If so, processing continues at step 504 to set an affirmative device support default for the lightweight element (i.e., indicating that the lightweight element supports a given device).

At step 506, a determination is made whether the lightweight element implements an interface that indicates that the element does not support a given device. If so, processing continues at step 508 to mark the lightweight element as not supporting the device and processing ends at step 510. If it is determined, at step 506, that the lightweight element does not implement a non-supporting interface, processing ends at step 510.

If it is determined, at step 502, that the screen element is not a lightweight element, processing continues at step 512. A determination is made, at step 512, whether the screen element implements a device-supporting interface for a given device. If not, processing continues at step 516 to mark the element as not supporting the device. If it is determined at step 512 that the screen element implements a device-supporting interface for a given device, processing continues at step 514 to mark the element as supporting the device. In either case, processing ends at step 510.

Embodiment of Computer Execution Environment (Hardware)

Embodiments of the invention can be implemented as computer software in the form of computer readable code executed on a general purpose computer or on special purpose computer, or in the form of bytecode class files executable within a Java runtime environment running on such a general or special purpose computer.

Figure 6:
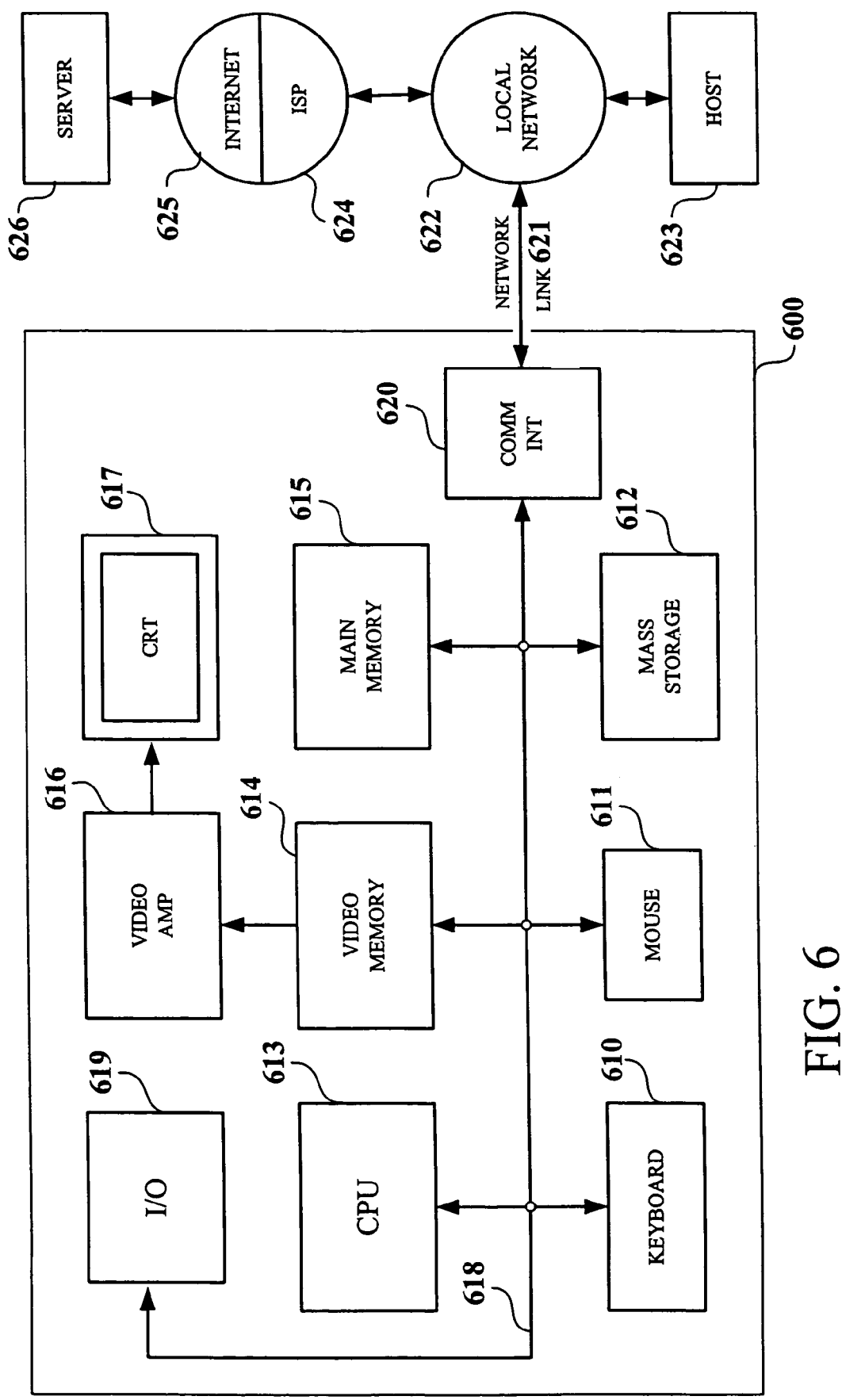
FIG. 6 is a block diagram of one embodiment of a computer system capable of providing a suitable execution environment for an embodiment of the invention.

FIG. 6 provides an example of a general purpose computer that may be used in embodiments of the invention. A keyboard 610 and mouse 611 are coupled to a system bus 618. The keyboard and mouse are for introducing user input to the computer system and communicating that user input to processor 613. Other suitable input devices may be used in addition to, or in place of, the mouse 611 and keyboard 610. I/O (input/output) unit 619 coupled to system bus 618 represents such I/O elements as a printer, A/V (audio/video) I/O, etc.

Computer 600 includes a video memory 614, main memory 615 and mass storage 612, all coupled to system bus 618 along with keyboard 610, mouse 611 and processor 613. The mass storage 612 may include both fixed and removable media, such as magnetic, optical or magnetic optical storage systems or any other available mass storage technology. Bus 618 may contain, for example, sixty-four address lines for addressing video memory 614 or main memory 615. The system bus 618 also includes, for example, a 64-bit data bus for transferring data between and among the components, such as processor 613, main memory 615, video memory 614 and mass storage 612. Alternatively, multiplex data/address lines may be used instead of separate data and address lines.

In one embodiment of the invention, the processor 613 is a microprocessor such as the SPARC microprocessor from Sun Microsystems, Inc., the 680X0 processor manufactured by Motorola, or a microprocessor manufactured by Intel such as the 80X86 or Pentium processor. However, any other suitable microprocessor or microcomputer may be utilized. Main memory 615 is comprised of dynamic random access memory (DRAM). Video memory 614 is a dual-ported video random access memory. One port of the video memory 614 is coupled to video amplifier 616. The video amplifier 616 is used to drive the cathode ray tube (CRT) raster monitor 617. Video amplifier 616 is well known in the art and may be implemented by any suitable apparatus. This circuitry converts pixel data stored in video memory 614 to a raster signal suitable for use by monitor 617. Monitor 617 is a type of monitor suitable for displaying graphic images. Alternatively, the video memory could be used to drive a flat panel or liquid crystal display (LCD), or any other suitable data presentation device.

Computer 600 may also include a communication interface 620 coupled to bus 618. Communication interface 620 provides a two-way data communication coupling via a network link 621 to a local network 622. For example, if communication interface 620 is an integrated services digital network (ISDN) card or a modem, communication interface 620 provides a data communication connection to the corresponding type of telephone line, which comprises part of network link 621. If communication interface 620 is a local area network (LAN) card, communication interface 620 provides a data communication connection via a network link 621 to a compatible LAN. Communication interface 620 could also be a cable modem or wireless interface. In any such implementation, communication interface 620 sends and receives electrical, electromagnetic or optical signals which carry digital data streams representing various types of information.

Network link 621 typically provides data communication through one or more networks to other data devices. For example, network link 621 may provide a connection through local network 622 to local server computer 623 or to data equipment operated by an Internet Service Provider (ISP) 624. ISP 624 in turn provides data communication services through the world wide packet data communication network now commonly referred to as the "Internet" 625. Local network 622 and Internet 625 both use electrical, electromagnetic or optical signals which carry digital data streams. The signals through the various networks and the signals on network link 621 and through communication interface 620, which carry the digital data to and from computer 600, are exemplary forms of carrier waves transporting the information.

Computer 600 can send messages and receive data, including program code, through the network(s), network link 621, and communication interface 620. In the Internet example, remote server computer 626 might transmit a requested code for an application program through Internet 625, ISP 624, local network 622 and communication interface 620.

The received code may be executed by processor 613 as it is received, and/or stored in mass storage 612, or other nonvolatile storage for later execution. In this manner, computer 600 may obtain application code in the form of a carrier wave.

Application code may be embodied in any form of computer program product. A computer program product comprises a medium configured to store or transport computer readable code or data, or in which computer readable code or data may be embedded. Some examples of computer program products are CD-ROM disks, ROM cards, floppy disks, magnetic tapes, computer hard drives, and servers on a network.

The computer systems described above are for purposes of example only. An embodiment of the invention may be implemented in any type of computer system or programming or processing environment; including embedded devices (e.g., web phones, etc.) and "thin" client processing environments (e.g., network computers (NC's), etc.) that support a virtual machine.

FIG. 6 provides an example of a general purpose computer that may be used in one or more embodiments of the invention. Special purpose computers may also be used in embodiments of the invention. Examples of special purpose computers or devices, include, without limitation, personal digital assistants, network computers, enhanced cellular and hardwired telephones, Internet-capable television sets, etc.

Thus, a method and apparatus for detecting device support in a graphical user interface has been described in conjunction with one or more specific embodiments. The invention is defined by the claims and their full scope of equivalents.

What is claimed is:

1. In a computer system, a method of determining input device support of a screen element of a graphical user interface, comprising:
   executing the graphical user interface;
   automatically examining executable portions of Java bytecode defining the screen element of the graphical user interface to determine whether the screen element is programmed with an ability to process a signal to be received from an input device, wherein the automatic examining of the executable portions of Java bytecode is performed without executing the Java bytecode;

as a result of automatically examining the executable portions of Java bytecode, automatically identifying an executable portion of the Java bytecode defining the screen element as having the ability to process the signal to be received from the input device; and as a result of automatically identifying the executable portion of the Java bytecode, altering an appearance of the screen element to signify the ability to process the signal to be received from the input device.

2. The method of claim 1, wherein the screen element represents a lightweight element capable of functioning independently from a native layer.

3. The method of claim 1, further comprising:

automatically identifying an inability of the screen element to process the signal to be received from the input device; and altering the appearance of the screen element to signify the inability to process the signal to be received from the input device.

4. A computer readable storage medium containing program instructions for determining input device support of a screen element of a graphical user interface, comprising:

program instructions for automatically examining executable portions of Java bytecode defining the screen element of the graphical user interface to determine whether the screen element is programmed with an ability to process a signal to be received from an input device, wherein the automatic examining of the executable portions of Java bytecode is performed without executing the Java bytecode;

program instructions for automatically identifying an executable portion of the Java bytecode defining the screen element as having the ability to process the signal to be received from the input device as a result of automatically examining the executable portions of Java bytecode; and program instructions for altering an appearance of the screen element to signify the ability to process the signal to be received from the input device as a result of automatically identifying the executable portion of the Java bytecode.

5. The computer readable storage medium of claim 4, further comprising:

program instructions for automatically identifying an inability of the screen element to process the signal to be received from the input device; and program instructions for altering the appearance of the screen element to signify the inability to process the signal to be received from the input device.

6. In a computer system, a method of detecting input device support of a graphical user interface, comprising:

automatically examining a set of executable instructions within a computer program formed in a interpreted programming language for operating a region of the graphical user interface to determine whether the region is programmed with an ability to respond when input is received from an input device, the region of the graphical user interface containing one or more screen elements, wherein the automatic examining of the set of executable instructions within the computer program is performed without executing the set of executable instructions within the computer program;

automatically identifying one or more input device-handling executable instructions in the set of executable instructions within the computer program as a result of automatically examining the set of executable instructions within the computer program;

automatically determining which of the one or more screen elements is associated with the one or more input device-handling executable instructions; and altering an appearance of the one or more screen elements associated with the one or more input device-handling executable instructions to signify the ability to respond when input is received from the input device, wherein the computer program formed in the interpreted programming language is executable by a virtual machine compiled to operate on the computer system.

7. A computer readable storage medium containing program instructions for detecting input device support of a graphical user interface, comprising:

program instructions for automatically examining a set of executable instructions within a computer program formed in a interpreted programming language for operating a region of the graphical user interface to determine whether the region is programmed with an ability to respond when input is received from an input device, the region of the graphical user interface containing one or more screen elements, wherein the automatic examining of the set of executable instructions within the computer program is performed without executing the set of executable instructions within the computer program;

program instructions for automatically identifying one or more input device-handling executable instructions in the set of executable instructions within the computer program as a result of automatically examining the set of executable instructions within the computer program;

program instructions for automatically determining which of the one or more screen elements is associated with the one or more input device-handling executable instructions; and program instructions for altering an appearance of the one or more screen elements associated with the one or more input device-handling executable instructions to signify the ability to respond when input is received from the input device, wherein the computer program formed in the interpreted programming language is executable by a virtual machine compiled to operate on a computer system.

8. A computer comprising:

a display for displaying at least one screen element of a graphical user interface;

at least one input device; and a detector structured to automatically examine executable instructions within a textual version of program code associated with the at least one screen element to detect an ability to process an input signal to be received from the at least one input device, the detector further structured to alter a display of the at least one screen element to signify that the at least one screen element is capable of processing signals to be received from the at least one input device, wherein the automatic examining of the executable instructions within the textual version of the program code is performed without executing the program code wherein the program code is formed in an interpreted programming language that is executable by a virtual machine compiled to operate on the computer.

9. The computer of claim 8, wherein the detector includes program code readable by a processor of said computer.

10. The computer of claim 8, wherein the detector is further structured to examine executable instructions within the textual version of the program code associated with the at least one screen element to detect an inability to process the input signal to be received from the at least one input device, the detector further structured to alter the display of the at least one screen element to signify that the at least one screen element is incapable of processing signals to be received from the at least one input device.

* * * * *